No. 697,300. Patented Apr. 8, 1902.
J. G. WATSON.
ANCHOR.
(Application filed Sept. 28, 1901.)
(No Model.)
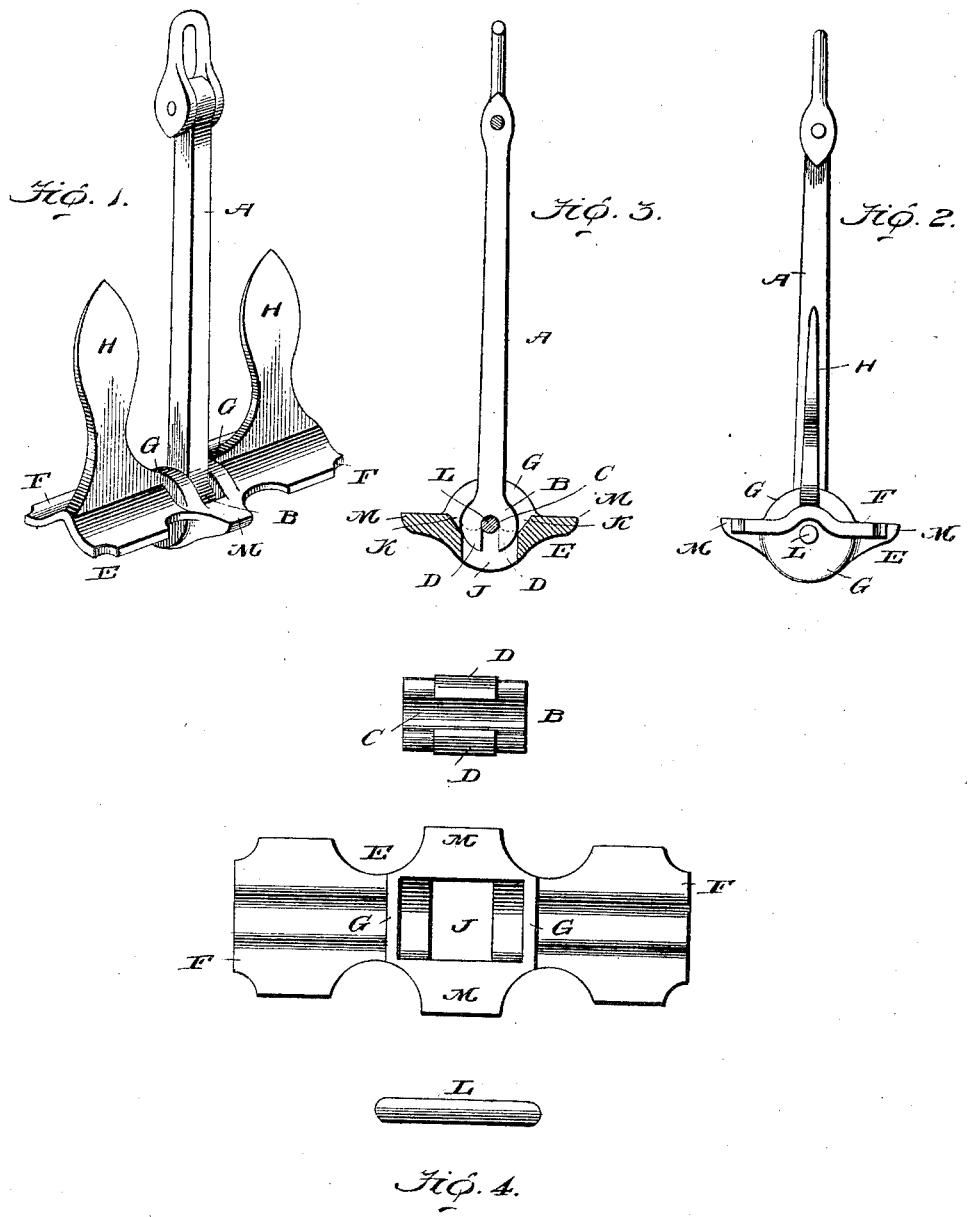

UNITED STATES PATENT OFFICE.

JOHN G. WATSON, OF CHESTER, PENNSYLVANIA.

ANCHOR.

SPECIFICATION forming part of Letters Patent No. 697,300, dated April 8, 1902.

Application filed September 28, 1901. Serial No. 76,882. (No model.)

*To all whom it may concern:*

Be it known that I, JOHN G. WATSON, a citizen of the United States, residing at Chester, in the county of Delaware and State of Pennsylvania, have invented certain new and useful Improvements in Anchors, of which the following is a specification.

My invention relates to improvements in anchors, and is an improvement upon the anchor for which Letters Patent were granted to me March 6, 1900, No. 644,955.

The object of this invention is to improve the anchor and insure a more useful, simple, inexpensive, and practical one.

The invention consists of an anchor embodying novel features of construction and combination of parts, substantially as disclosed herein.

Figure 1 represents a perspective view of my anchor. Fig. 2 represents an end view. Fig. 3 represents a vertical sectional view, and Fig. 4 represents a detail view of the parts of my anchor detached.

In the drawings, A designates the shank of the anchor, which at its lower end is formed with the curved saddle-block B, having the saddle-bearing channel C, the ears D forming a bearing-block on the shank for retaining the saddle-block in its proper place.

E designates the head of the anchor, having the lateral extensions F, the curved or rounding central enlargement G, and the flukes H. The central enlarged portion is formed with the seat or bearing J for the curved saddle-block on the shank, which shank fits and moves in the opening K in the upper face of the enlarged central part of the head, and to pivotally or swingingly mount the anchor-shank to the head I employ the pin L. The central enlarged portion of the head is further provided with the extensions M, which when the anchor is in use rest upon the ground.

It is evident that I provide an anchor which will operate effectively, which will readily clear itself of accumulations of mud, and which is simple, durable, and inexpensive of construction and thoroughly practical. It will also be seen that the saddle-block is formed with a slot or seat, which allows the pin to be inserted with ease to hold the saddle-block in the proper place. The flukes, it will be seen, are formed with a curved or channeled portion, which permits easy access to the pivot-pin.

I claim—

1. An anchor consisting of the head formed with the wings or extensions provided on the under face with a central channel, said head also carrying flukes and having saddle-bearing provided with the extensions, the shank, the saddle-blocks carried by the shank being slotted out for pin to pass through to hold in said portion.

2. The anchor, consisting of the head carrying the flukes and formed with the central enlarged portion having a shank-receiving opening and a seat or bearing on each side of the opening, the shank fitting in said opening and having the saddle-block fitting in the bearing of the head, said saddle-block having an open bearing-channel, ears or guides on each side of said channel and a pin connecting the shank to the head.

3. An anchor consisting of the head having a central enlargement formed with a seat or bearing, the extensions on the head formed with a channel, the flukes carried by the head, the shank fitting in the head and carrying the saddle-block formed with an open bearing-channel formed with a pair of ears or guides, and a pin arranged in the head and pivoting the shank therein.

In testimony whereof I affix my signature in presence of witnesses.

JOHN G. WATSON.

Witnesses:
 EDMUND OLIVER,
 BENJ. C. FOX,
 J. PARRY COMPTON.